L. A. WOODARD AND H. H. TALBOT.
GEAR CUTTING MACHINE.
APPLICATION FILED JULY 30, 1920.

1,421,116.

Patented June 27, 1922.
9 SHEETS—SHEET 6.

Inventor
LOUIS A. WOODARD
HOWARD H. TALBOT
By W.C.Carman
Attorney

L. A. WOODARD AND H. H. TALBOT.
GEAR CUTTING MACHINE.
APPLICATION FILED JULY 30, 1920.

1,421,116.

Patented June 27, 1922.
9 SHEETS—SHEET 7.

INVENTORS
LOUIS A. WOODARD
HOWARD H. TALBOT
By W. C. Carman
Attorney

UNITED STATES PATENT OFFICE.

LOUIS A. WOODARD AND HOWARD H. TALBOT, OF WOOSTER, OHIO.

GEAR-CUTTING MACHINE.

1,421,116.     Specification of Letters Patent.    Patented June 27, 1922.

Application filed July 30, 1920. Serial No. 400,218.

*To all whom it may concern:*

Be it known that we, LOUIS A. WOODARD and HOWARD H. TALBOT, citizens of the United States, residing at Wooster, in the county of Wayne and State of Ohio, have invented certain new and useful Improvements in Gear-Cutting Machines, of which the following is a specification.

This invention relates in general to gear cutting, and has particular reference to an improvement in machines for cutting gears with straight, spur or double or single helical teeth of varied pitch.

To this end the invention has in view a machine that will expedite and simplify the manufacture of heavy helical or straight toothed gears particularly adapted for rolling mill work. In this connection it is proposed to provide a novel construction which permits of a rapid machining of the gears by means of a milling or other suitable cutting tool.

Accordingly, a distinctive feature of the invention resides in providing means whereby the cutting and planing instrumentalities may be shifted transversely from one edge of the gear to the other while the gear blank is oscillated or rocked through the proper arc of a circle, to thereby form the tooth by a series of reciprocations of the tool carrier. In other words, it is proposed to provide synchronized operating parts which simultaneously operate on the gear blank and reciprocate the cutting instrumentalities partially or entirely across the face of the same, as hereinafter more fully explained.

A further and more specific object of the invention is to provide a machine which may be readily adapted to cut gears of different diameter by reason of the relatively adjustable and extensible character of the several synchronized operating units.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which.

Similar reference numerals designate corresponding parts throughout the several figures of the drawings.

As previously indicated, one of the distinctive features of the invention is the provision of a machine for forming double helical teeth on the face of the gear blank by a series of reciprocations of the cutting instrumentalities. To carry this into effect it is necessary to provide a series of units which are arranged in cooperating relation and effectively synchronized to carry the several steps of the gear cutting operation into effect.

Accordingly, by reference to the accompanying drawings it will be observed that the present machine includes in its organization opposite bed members 1 and 2 having the parallel guide ways 3 and 4, respectively, for adjustably mounting suitable journal elements for the work or blank supporting and manipulating devices, to enable the machine to cut gears of various diameters. That is to say, it is proposed to mount the blank supporting means and all of its cooperating parts in such manner that they may be shifted at right angles to the stationary bed 5 of the tool carriage designated generally as C. The said carriage includes a platform or table 6 adapted to be reciprocated on the tracks or guides 7 of the bed, through suitable connections with the gearing in housing A of the automatically reversing operating unit designated in its entirety as O, and including the automatically reversing motor 75, of any approved type, driving shaft 76 and devices 77 and 78.

The work or blank supporting instrumentalities which are shiftably mounted on the base members 1 and 2 preferably consist of the outboard journal member 8 having clamping means designated generally as 9 for releasably engaging one end of the mandrel 10 of the gear blank supporting unit, and the opposite journal member 11 for supporting the hollow sleeve 12 which houses the spindle 13. This spindle is in effect a continuation of the mandrel 10 (the two being secured in axial alinement to opposite sides of the face plate 14, hereinafter referred to), and serves as a means to rotate the mandrel to advance the gear blank carried thereby the desired distance to form the next tooth, through the indexing mechanism designated generally as M and, except for the wheel W thereof, carried by the sleeve 12, as will hereinafter more fully appear.

Figure 3:
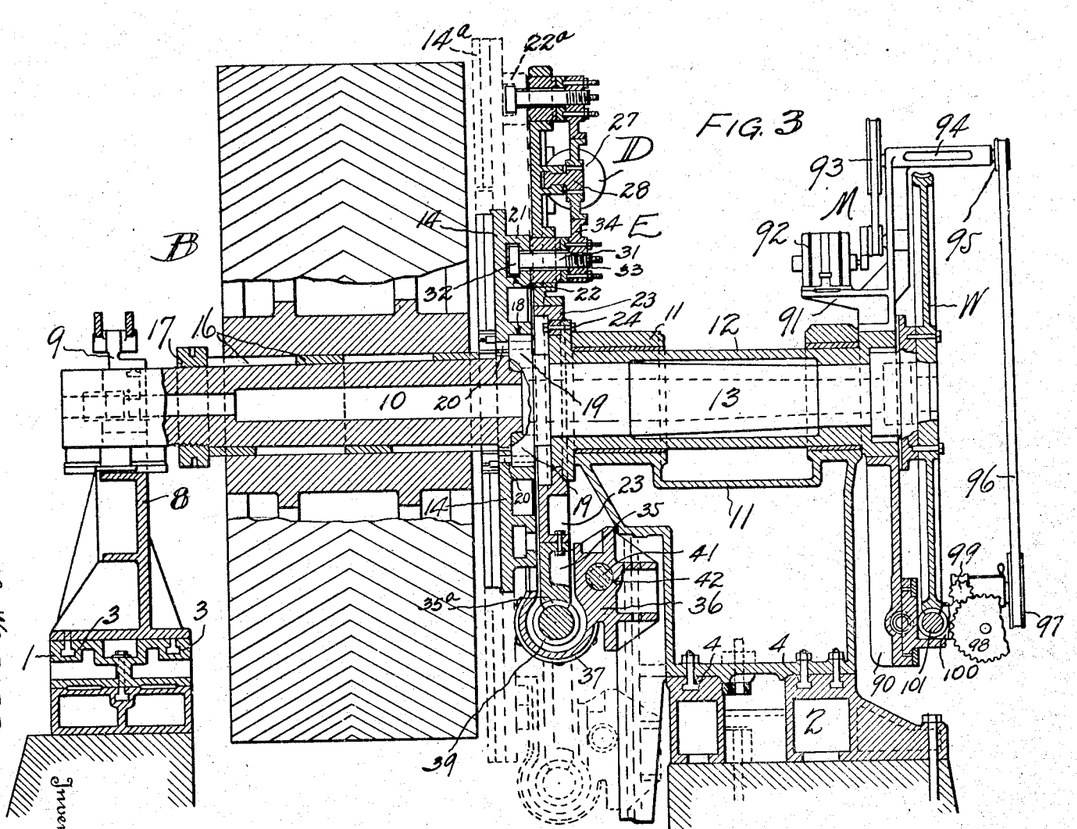
Figure 3 is a vertical sectional view.

The gear blank supporting unit includes the mandrel 10, previously referred to, and the face plate 14, the latter being rigid with the mandrel and assisting to hold and steady the gear blank B thereon by suitable clamping devices 15. From Figure 3 of the drawings it will be observed that the mandrel 10 is of tapering formation whereby the gear blank may be conveniently secured thereto by means of the expanding bushings 16 and adjustment nut 17, so that with the assistance of the clamping devices 15 of the face plate the said blank may be rigidly held in position to prevent creeping or accidental displacement during the tooth cutting operation.

The face plate 14 of the work or blank support is preferably provided on its side opposite the mandrel with the socket 18 for receiving the head or flanged portion 19 of the spindle 13, and for the purpose of locking both the spindle and the mandrel to the face plate to provide, in effect, a unitary construction, suitable locking means 20 may be employed. The rear side of the face plate 14 is also provided with an annular ring 21 having a substantially inverted T-shaped locking channel 22 for the purpose of cooperating with the bolt 31 of the manually controlled locking device D of the oscillating means E, to be presently referred to.

One of the novel and distinctive features incident to the construction of the blank support is the provision of an extension ring 14ª which may be secured to the periphery of the face plate 14 to increase its diameter in order to enable the machine to handle gear blanks of relatively large diameter. The purpose of this extension ring is to relieve the torque on the oscillating device when cutting gears of large diameter, by increasing the length of the lever which is represented by the radius of the face plate, and at the same time relieve the machine of all deflection and spring. And, as shown in the drawings, the said extension ring is provided with the T channel 22ª to cooperate with the bolt 31 of the manually controlled locking device D of the oscillating element E, in the same manner as channel 22 serves when the extension ring is not used.

The oscillating element E constitutes one of the practical and important features of the invention, and, as may be inferred from the foregoing, is so mounted that it may move relatively independent of the work or blank support, in order to permit of indexing as hereinafter explained, while at the same time it may be coupled or locked firmly to the support during the cutting operation.

As shown, the frame 23 of the oscillating element is secured as at 24 to the sleeve 12, which houses the spindle 13 (Figures 3–5), so that the oscillating element E, sleeve 12, and the indexing mechanism M (except wheel W) carried by the outer end of the sleeve, are, in effect, a unitary part. The frame 23 is provided with the flat bolting face 25 for facilitating the attachment of the relatively triangular frame 26 which carries the manually controlled locking device D. This device includes the fluid pressure cylinder 27 and plunger rack 28 adapted to engage with the segment 29 at one end of the lever or locking arm 34, the opposite end of which is threaded upon the outer end of bolt 31 at 30, as hereafter explained. This lever is shifted to the upper location (30ª) in the upper part of the frame 26 when the face plate extension 14ª is used, whereby the oscillating element may be locked with the extension ring of the face plate instead of directly with the face plate itself. The said locking member 30 includes the locking bolt 31 having a head 32 for riding in the channel 22 of the ring 21, while the outer end is threaded as at 33 to receive the lever arm 34 carrying the segmental rack 29.

The fluid pressure device is controlled manually by suitable valves—not shown—accessibly located at the operating station.

Shifting the rack 28 in one direction will tighten the lever 34 on the bolt 31 thereby binding the oscillating element E firmly to the face plate 14, so that the gear blank may be oscillated during the cutting process.

Figure 5:
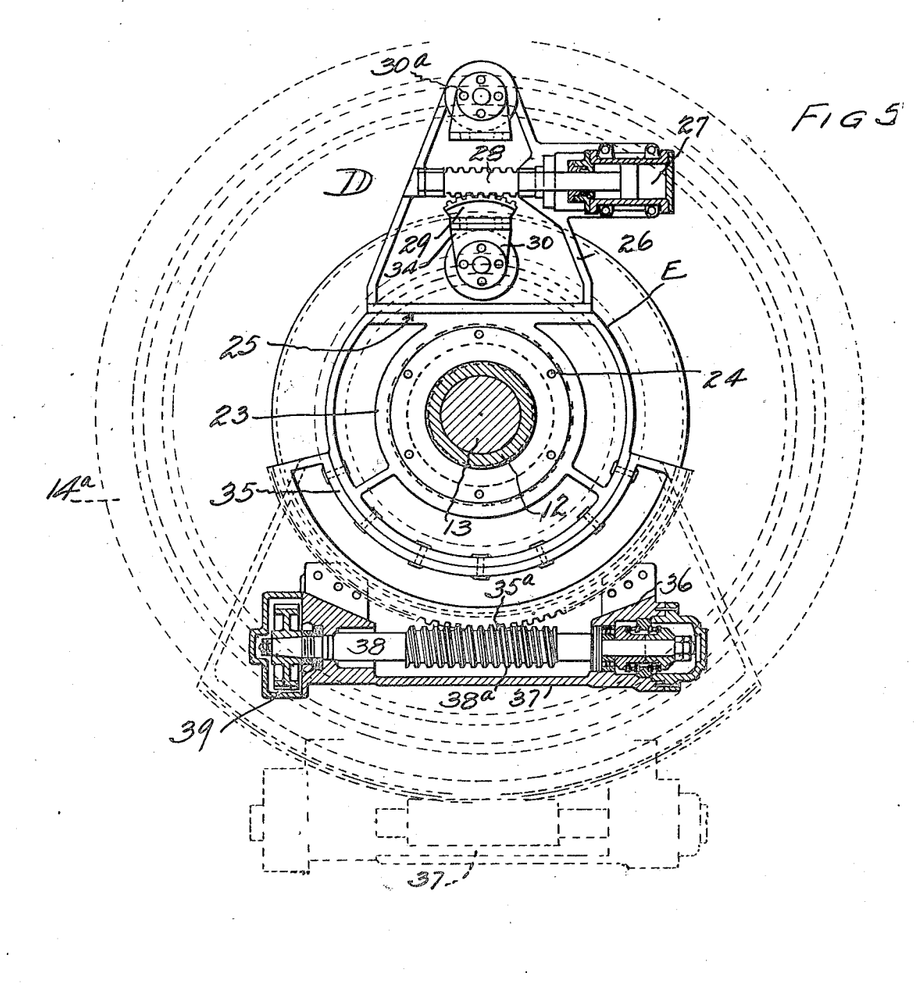
Figure 5 is a vertical sectional view taken on the line 5—5 of Figure 2.

Referring further to the oscillating element E, it will be observed—Figure 5—that the frame 23 thereof has secured to its lower side a relatively large segment 35, carrying a driving rack 35ª, which may be of the size shown by the full lines or of the increased size and radius shown by the dotted lines, according to the size of the gear blank being operated upon. The driving rack 35ª is adapted to be actuated by a relatively adjustable worm unit which, however, may be held stationary when used with either the face plate 14 or its extension 14ª. The said worm unit may be set or adjusted to the varying sizes of the segment 35.

The said worm unit preferably includes a body casting 36 having a housing portion 37 for the worm gear spindle 38, the convolute tooth 38ª which engages directly the teeth 35ª of the rack segment 35. The worm spindle 38 is therefore journaled in the opposite ends of the housing 37 and carries at one end an operating pinion 39 adapted to mesh with a driving gear 40 feathered keyed to the relatively long driving shaft 41. This shaft 41 passes through the bore 42 in the body casting 36—Figure 3—and has its opposite ends journaled as at 43 and 44 in the vertically adjustable bearings 45 and 46, located at the rear end of bed 2 and at the inner end of bed 5, respectively—Figure 2. The purpose of mounting the driving shaft 41 in the vertically adjustable bearings 43 and 44 is to enable the worm unit to be raised and lowered to mesh with the small or large segments 35, as previously indicated.

To impart the required oscillating motion to the segment 35, shaft 41 must turn alternately in opposite directions, and for that purpose a novel suspended gear train, designated generally as 48, is employed. This suspended gear train is a part of the main operating unit for synchronizing the reciprocating movement of the tool carrier 6ª mounted on the carriage C with the oscillating movement of the gear blank.

Figure 6:
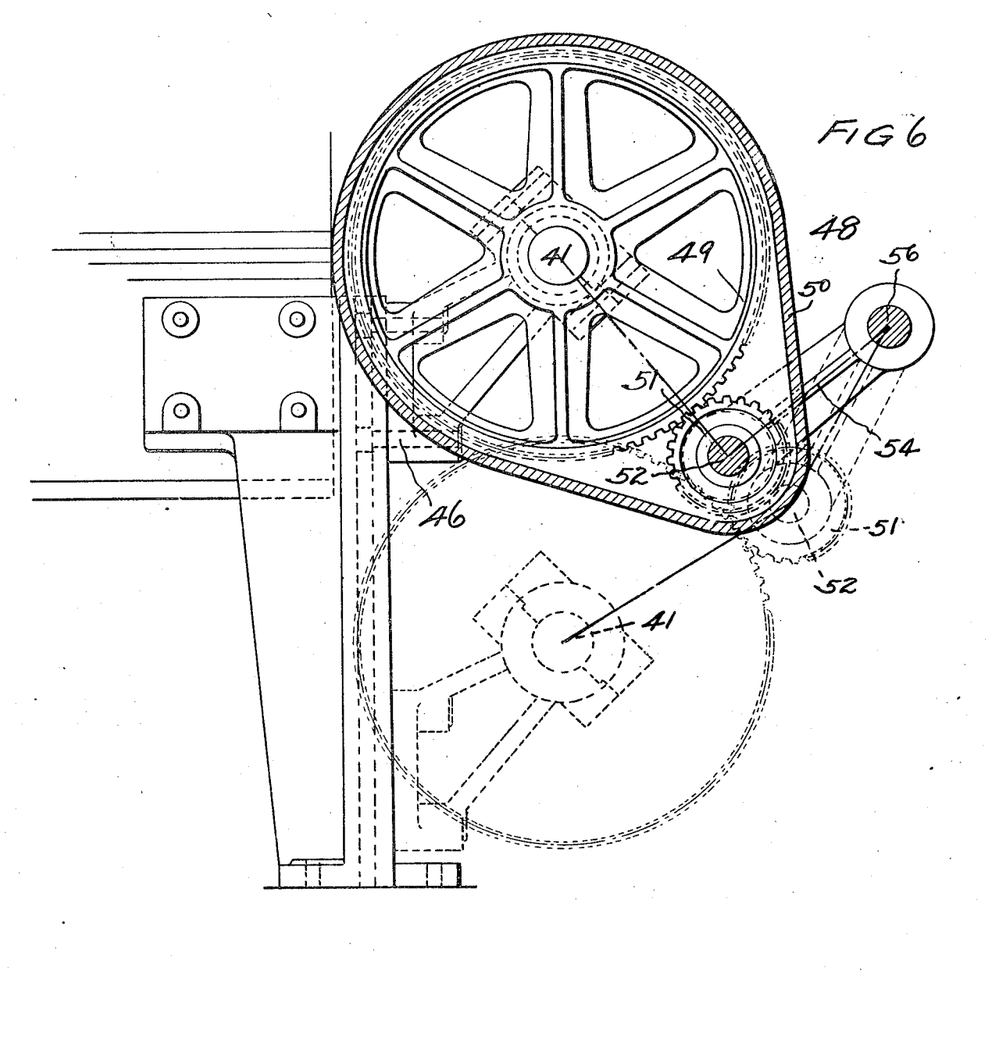
Figure 6 is a detail view of the suspended gear train unit looking from the front of the machine.
Figure 7:
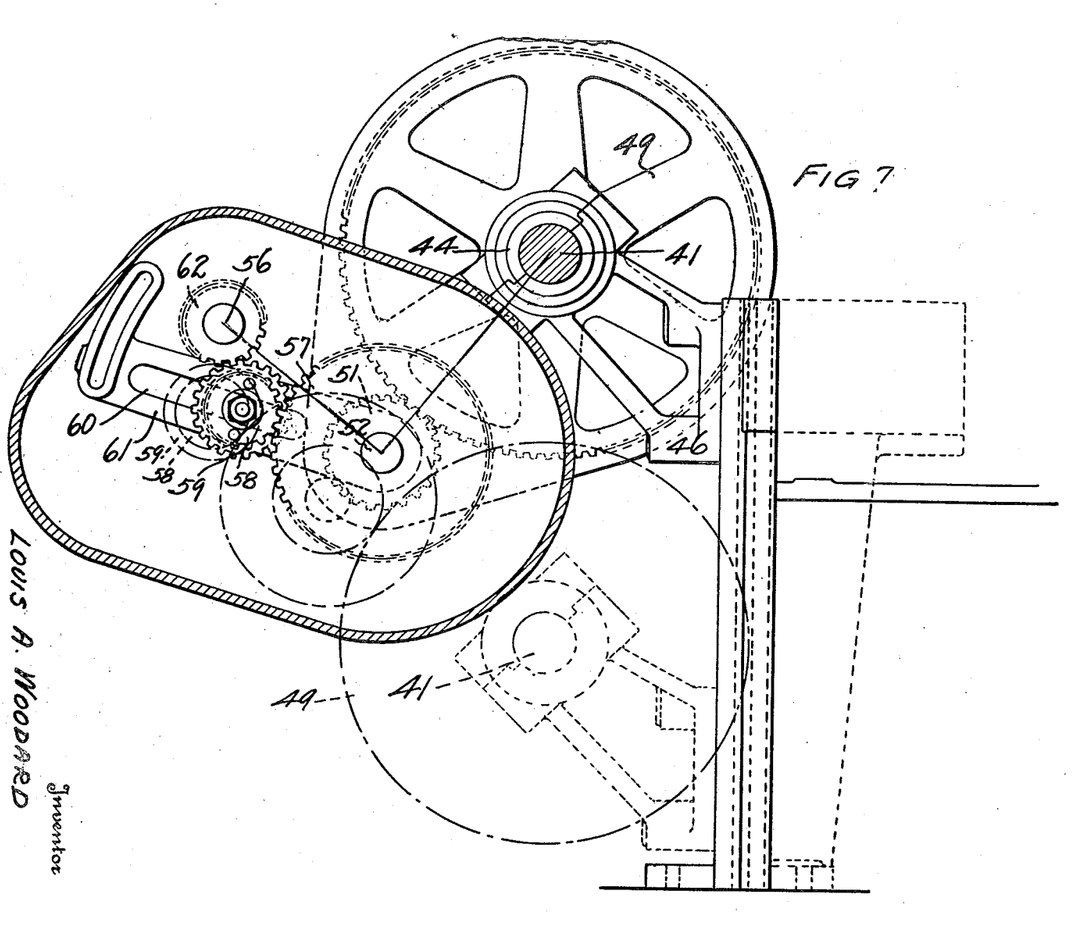
Figure 7 is a view of the parts shown in Figure 6 looking from the back of the machine.

Figures 6 and 7 show the relative positions of the shaft 41, which is driven by this gear train 48, when segment 35 of long or short radius is employed.

Figure 8:
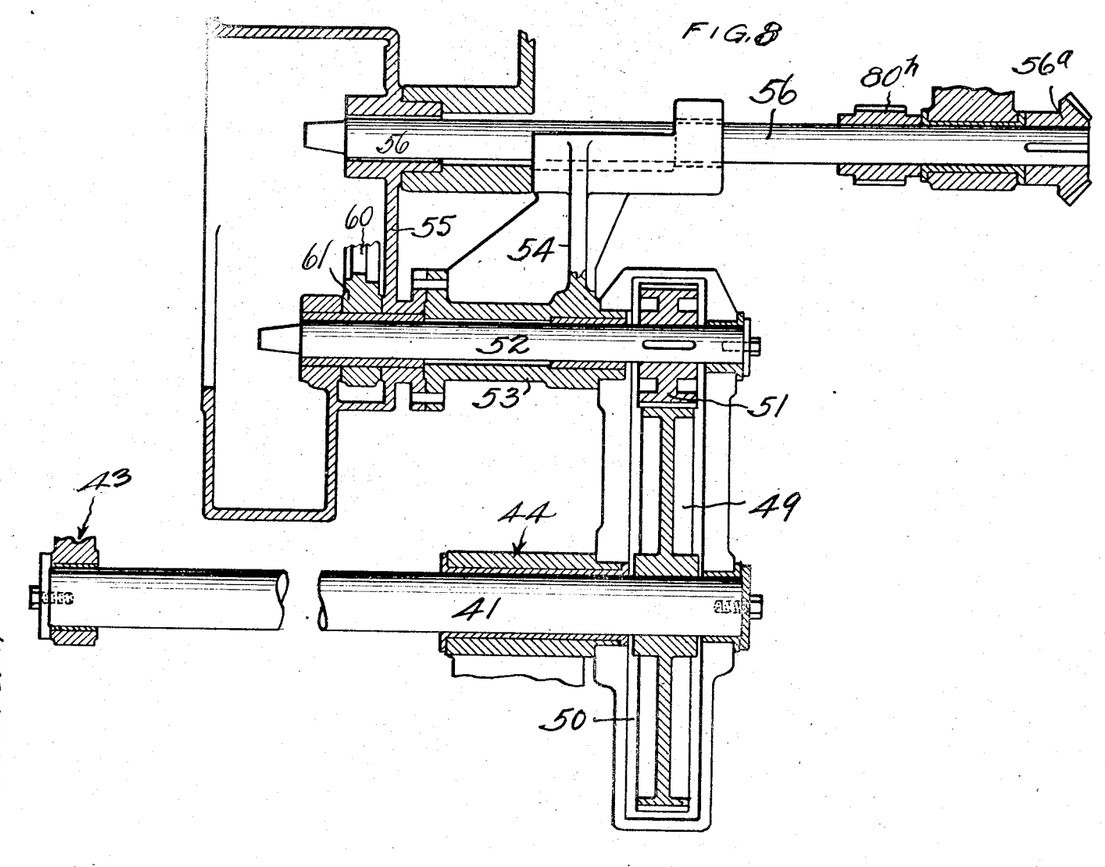
Figure 8 is a detail vertical sectional view of the construction shown in Figures 6 and 7.
Figure 9:
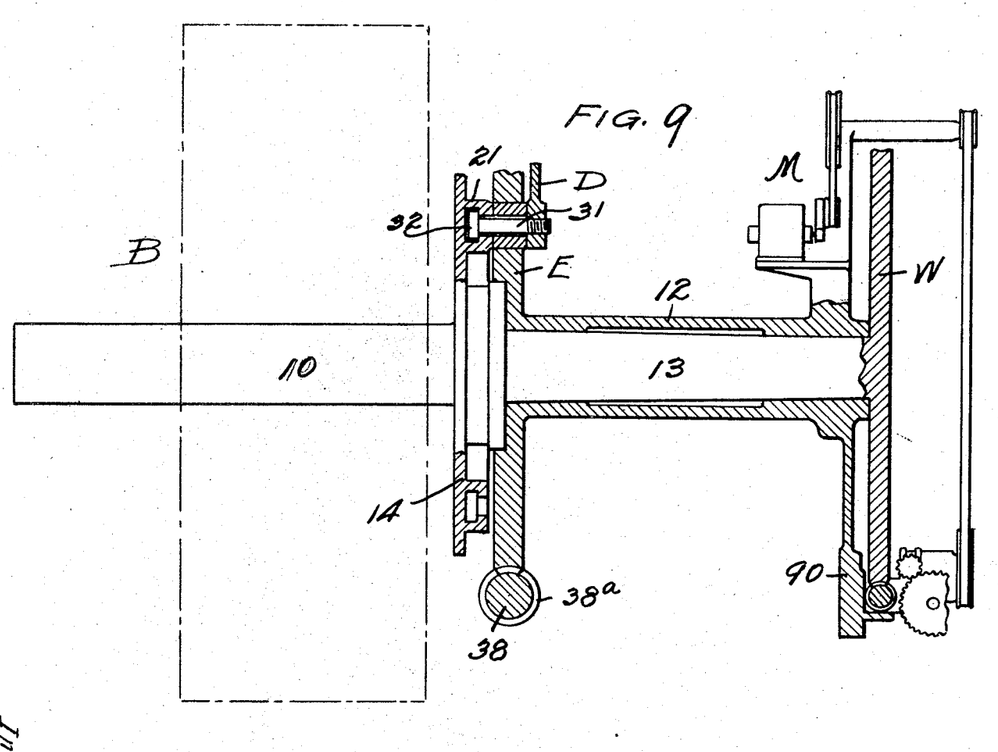
Figure 9 is a diagram illustrating the relative relation of the various operating parts of the machine.

As shown in Figure 6, shaft 41 carries a relatively large gear 49 arranged within the housing 50 and meshing with the relatively small driving gear 51, mounted on a relatively shiftable jackshaft 52 which is journaled in the bearing sleeve 53 carried by the bracket parts 54 and 55 suspended from a main drive shaft 56. See Figure 8. Shaft 56 constitutes a fixed axis or center about which the shaft 52 may shift in a relatively circumferential path as indicated by the full and dotted lines positions of the jackshaft 52 and gear 51 in Figure 6.

The said jackshaft 52, which constitutes a motion transmitting coupling between the main drive shaft 56 and the shaft 41, is fitted at its end opposite the gear 51 with a relatively large driven gear 57 adapted to mesh with the pinion 58 on the idler gear 59, whose journal slides in the slot 60 of the arm 61 to maintain the operative connection between the main driving pinion 62 on the end of drive shaft 56 and gear 57 of jackshaft 52.

The slidable mounting of gear 59 on arm 61, and the radial adjustment of arms 61 around shaft 52, with relation to bracket arms 54 and 55, is of material importance, as it enables the use of differing size gears 57, 58, 59 and 62 to provide the proper speed ratio of this train of gears,—this ratio being determined by the desired angle of the helix of the teeth on the helical gear. In other words, gears 57, 58, 59 and 62 are changed in order to provide the proper ratio of speed between the oscillating element or device and the cutting tool, to give the tooth the proper helical angle.

As shaft 41 moves downwardly to its lowermost position, gear 51 on shaft 52, which meshes with gear 49 on shaft 41, will follow gear 49, as indicated by dotted lines in Figure 6, by simply utilizing the bracket arms 54 and 55 as the radius of the arc of movement.

The main driving shaft 56 is given a reversing motion by means of bevel gear 56ª thereon meshing with its mating gear 56ᵇ on shaft 76 driven by reversing motor 75 through change gear 77 and reduction gear 78 of the operating unit O.

The cutter carriage C is automatically reciprocated simultaneously with the oscillation of the blank, through the medium of the shaft 80, carrying at one end the worm 81, which meshes with the rack 82 fitted to the underside of the platform or table 6 of the cutter carrier, and at the other end, the opposing bevel gears 80ᵇ and 80ᶜ slidably mounted or splined upon the shaft. Each of these gears, 80ᵇ and 80ᶜ, is adapted to engage, independently of the other, with the pinion 80ᵈ carried at one end of the stub-shaft 80ᵉ, suitably mounted as at 80ᶠ, and carrying at its opposite end the relatively large driven gear 80ᵍ meshing with the driving pinion 80ʰ on the shaft 56, which, as already suggested, is given a reversing motion through the medium of the pinion 56ª, which meshes with the gearing of the automatic reversing gear device A of the main driving unit.

It will be apparent that with this arrangement the shaft 80 will be given a reversing movement through the medium of driving pinion 80ʰ, driven gear 80ᵍ, stubshaft 80ᵉ, driving pinion 80ᵈ and bevel gear 80ᵇ or 80ᶜ, as may be required to drive the cutter carrier in the right direction, depending upon whether the machine is operating upon the right or left hand arm or branch of the double helical tooth.

Figure 1:
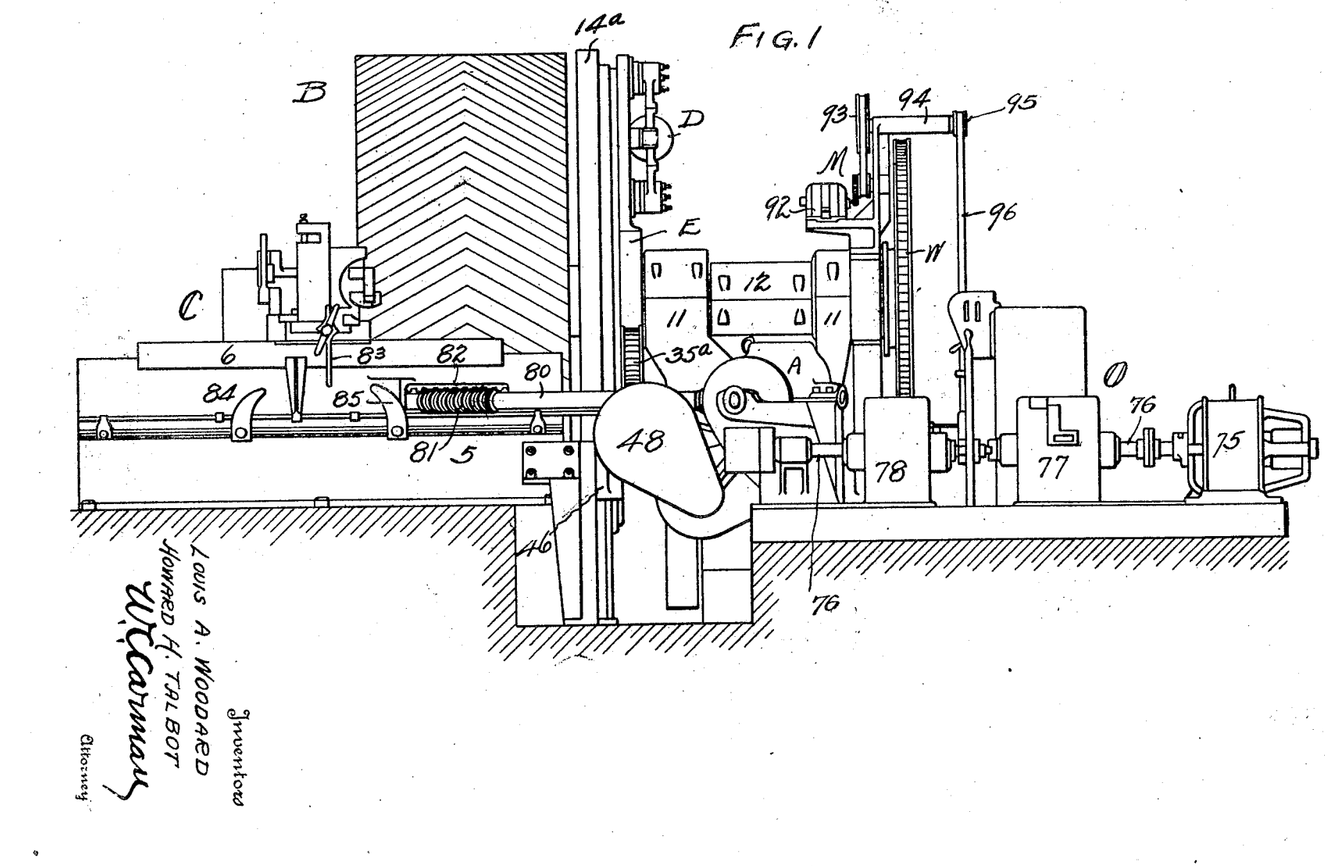
Figure 1 is a front elevation of the machine.
Figures 2, 4:
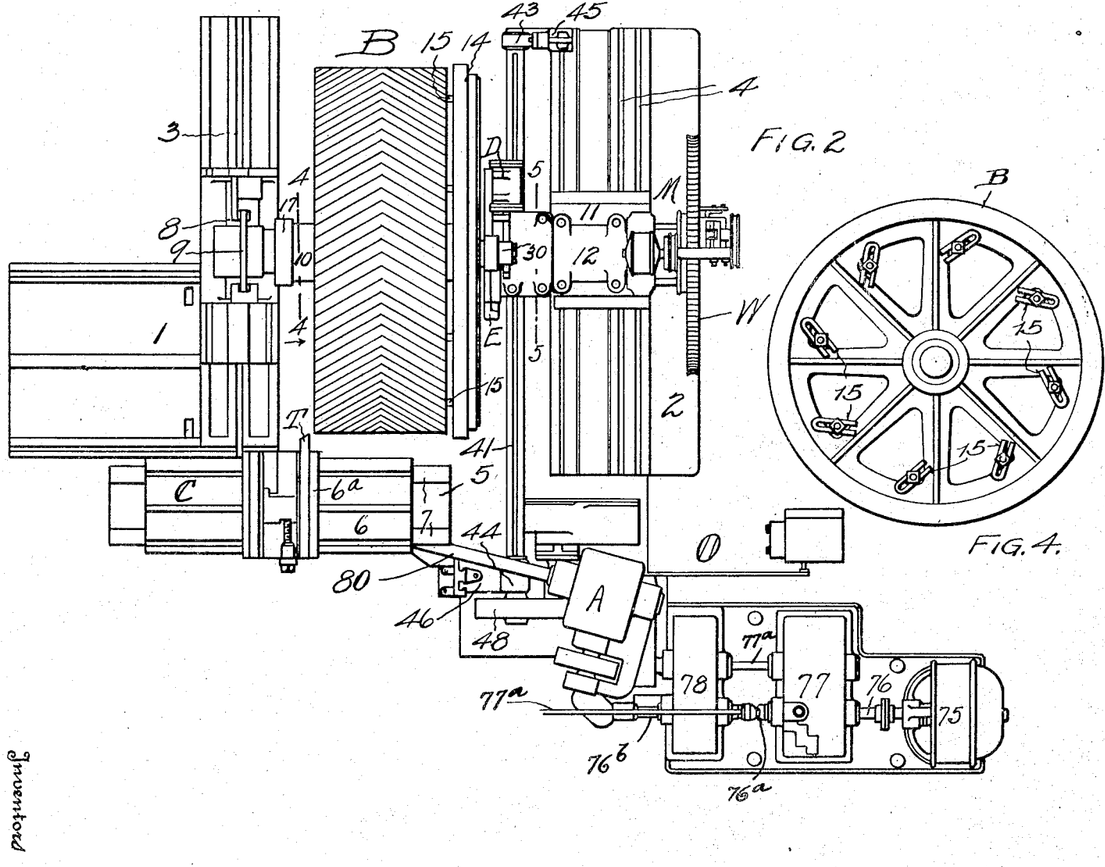
Figure 2 is a top plan view thereof.
Figure 4 is a vertical sectional view taken on the line 4—4 of Figure 2.

The gear blank may first be operated upon by a routing tool or milling head which forms the tooth roughly, after which a planing tool T—Figure 2—guided by a former, may be used to finish the tooth and give it the desired contour. This tool may be progressively advanced into the work after each succeeding cutting stroke by any well known suitable means, such for instance as shown in Figure 1, including an arm 83 which strikes alternately against abutments 84 and 85 at the end of each stroke.

When the machine is used as a planer, the shaft 76, which is an extension of the motor shaft, drives directly through the shaft connections 76$^a$ and 76$^b$. In other words none of the gears in the gear boxes 77 and 78 are operating. When, however, it is desired to use an end milling cutter the said gears (not shown) in boxes 77 and 78 are thrown into mesh by shifting the clutch lever arm 77$^a$ whereupon the shaft 76$^b$ is driven through the countershaft 77$^a$ and its gearing connections. Due to the use of the reduction gearing in boxes 77 and 78, and which may be of any well known construction, the shaft 76$^b$ is driven very slowly. When the carriage C is used in connection with a planer tool a quick reciprocating motion is desired, but on the other hand when an end milling cutter is used a slow powerful feed is desirable, and the worm wheel 81 and rack 82 provide the required movement for the slow powerful feed necessary in the milling operation.

The indexing mechanism M, which includes an indexing wheel W previously referred to as being rigidly fitted to the spindle 13, is preferably of a standard type, including a bracket 90 rigidly fitted to the sleeve 12 and provided at its upper end with a motor support 91 for holding the motor 92 fitted with suitable driving connections for operating the wheel 93 mounted on shaft 94 at a position to clear the periphery of the wheel W. The said shaft 94 preferably carries a pulley 95 for receiving the belt 96 which drives pulley 97 that operates suitable gearing 98—99 supported as at 100 on the lower end of the bracket 90 and meshing with the worm gear 101 that engages with the indexing wheel W.

As the bracket 90 which supports the indexing mechanism is rigidly mounted on the sleeve 12 and the indexing wheel W is rigidly mounted on the spindle 13, the rotation of the worm 101 may advance the wheel W while the sleeve 12 is stationary, or, in other words, the wheel W will turn independently of the sleeve 12. However, since the spindle 13, face plate 14 and mandrel 10, are, in effect, a unitary structure, which is coupled with the oscillating element E by the locking device D for the purpose of oscillating the blank during the cutting process, it will be apparent that the locking device D must be released before the indexing movement can take place. This release is effected through the medium of the fluid pressure cylinder 27, by moving the rack 28 in the direction to loosen the lever 34 on the bolt 31, after which the indexing mechanism may be set in motion, turning the wheel W which in turn rotates the spindle 13, the face plate 14 and the mandrel 10 which carries the blank, thereby advancing the blank to the required position for cutting the next tooth, the head 32 of bolt 31 travelling loosely in the channel 22 on the rear of the face plate 14. The indexing mechanism is adjusted to automatically shut off when the blank is sufficiently advanced, after which the rack 28 is moved in the opposite direction to tighten the lever 34 on the nut 31, thereby re-locking the two elements together.

In operation, when cutting teeth straight across the full thickness of the blank, the oscillating mechanism is, of course, rendered inoperative, which may be done by removing or disengaging one or more of the gears 58, 59, 60 and 62 in the suspended gear train 48.

When cutting single helical teeth (straight teeth diagonally across the full thickness of the blank), the blank is rotated forward by the oscillating mechanism while the cutting tool is travelling the entire distance across the face of the blank, and will then reverse synchronously with the receding movement of the cutting tool.

Figure 10:
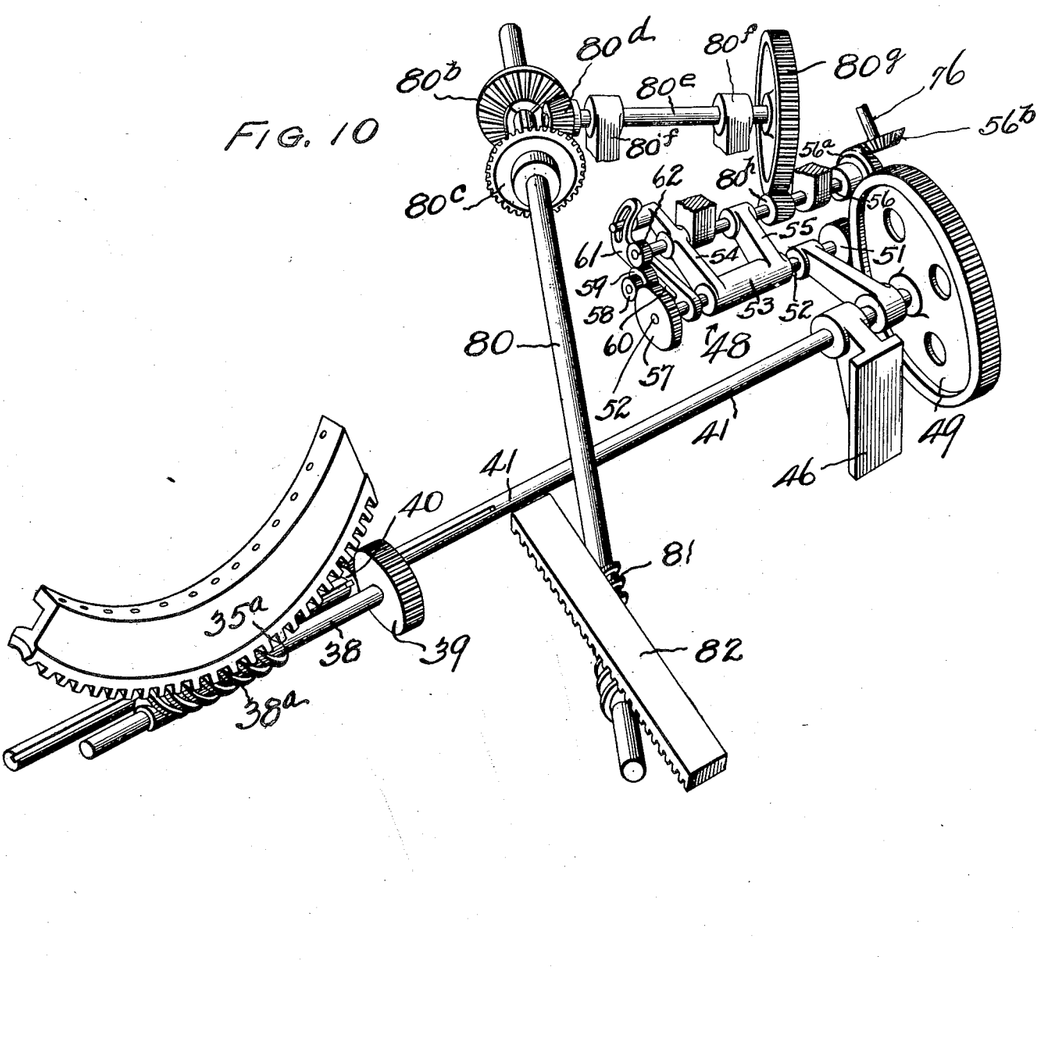
Figure 10 is a diagrammatic view of the gearing utilized to synchronize the movement of the cutter carriage and the oscillating blank support.

When cutting double helical teeth, however, as indicated on the blank in the drawings, a double process is necessary. First, one branch of the double helical is cut from the front face to the center of the blank, or apex of the double helical, clear around the blank. Then the other branch is cut from the center to the rear face of the blank, and this makes it necessary to change the direction of rotation of the blank during the cutting process, which is accomplished by changing from gear 80$^b$ to gear 80$^c$ (or vice versa as the case may be) on shaft 80, Figure 10.

As heretofore explained, the gearing in the housing A of the operating unit O operates the worm shaft 80, and also the shaft 41 (through the suspended gear train 48) which drives the worm spindle 38, thereby imparting to each of them such motion as will synchronously produce the reciprocating movement of the cutting tool and the oscillating movement of the blank.

From the foregoing it will be apparent that the machines makes adequate provision for adjustably mounting the gear blank with reference to the position of the reciprocating cutting device, whereby gears of different diameter may be cut with equal facility. And, by reason of the novel mounting of the gear support, it will be apparent that the same may be readily manipulated synchronously with the reciprocation of the cutter to expeditiously form teeth of the helical variety on the face of the gear.

Without further description, it is thought that the features and advantages of the invention will be readily apparent, and it will, of course, be understood that changes in the form, proportion and minor details of construction may be resorted to without departing from the spirit of the invention or scope of the appended claims.

We claim:—

1. In a gear cutting machine the combination with means for supporting the oscillating gear blank, of a carriage having mounted thereon a tooth forming device and means for operating said carriage with a quick or slow reciprocating movement according to the type of tooth forming tool mounted on the carriage, said means including a rack on the carriage, a worm engaging said rack, and a change speed gearing device operatively connected with said worm to impart a slow or rapid movement thereto.

2. A gear cutting machine including a support for the gear blank, means for oscillating the support, including a segment detachably connected with the support, and an operating unit including a worm having driving connections, said worm being adjustably mounted radially with reference to the segment to permit use of segments of varying radii.

3. A gear cutting machine including a support for the gear blank, said support including a face plate and a hub portion, a rack segment detachably fitted to said hub portion, and means for oscillating said rack segment including a suspended gear train, a driving worm operatively connected with said gear train and engaging said rack, and means whereby said worm may be supported at different distances from the axis of the blank support to accommodate rack segments of different radii.

4. A gear cutting machine including a support for the gear blank, said support comprising a mandrel and a face plate, an extension ring for the face plate, indexing means for the support, an oscillating device journaled independently of the support, a manually controlled device for locking the oscillating device with the face plate, said locking device including a pair of locking elements for use either with the original face plate or extension thereof, an operating extension for said oscillating device, a shiftable tool carrier mounted to reciprocate across the face of the gear carried by the support, and an operating unit including gearing for simultaneously actuating the said oscillating device and reciprocating the tool carrier.

5. In a gear cutting machine, a support for the gear blank including a face plate having a locking channel, journal means for said support, an oscillating frame journaled independently of the support, a locking device carried by said frame and including a bolt having its head riding in the channel of said face plate, and manually controlled means for moving the bolt axially to lock the face plate and frame together, a segmental rack detachably carried by said frame, a shiftable cutter carrier mounted to move in a rectilinear path across the face of the gear carried by said support, and an operating unit having gearing for simultaneously reciprocating the tool carrier and oscillating the said frame.

6. A gear cutting machine including a support for the gear blank including a face plate, journal means for the support, an oscillating frame journaled independently of the support, a manually controlled locking device carried by the frame and having a bolt adapted to clampingly engage the face plate to lock the frame and plate together, a segmental rack carried by the frame, means for operating said rack including a worm shaft, bearings for said worm shaft carried by the said frame, a gear on said worm shaft, a relatively long shaft having a gear keyed thereto for engaging with said gear on the worm shaft, a shiftable tool carrier, and an operating unit including gearing for reciprocating the shiftable tool carrier and simultaneously operating the said relatively long shaft.

7. In a gear cutting machine, a support for the gear blank including a supporting mandrel, a spindle connected with said mandrel, a sleeve member carrying indexing mechanism operatively connected with said spindle, and coupling means cooperating with the sleeve member for transmitting oscillating movement to the mandrel.

8. In a gear cutting machine, a support for the gear blank including a supporting mandrel, a spindle connected with said mandrel, a sleeve member carrying indexing mechanism operatively connected with said spindle, and means including a releasable connection between the sleeve member and the support for transmitting an oscillating movement thereto.

9. In a gear cutting machine, a support for the gear blank including a supporting mandrel, a spindle connected with said mandrel, a sleeve member carrying indexing mechanism operatively connected with said spindle, and means including a manually controlled releasable connection between the sleeve member and the support for transmitting oscillating movement thereto.

10. In a gear cutting machine, a support for the gear blank including a supporting mandrel, a spindle connected with said mandrel, a sleeve member carrying indexing mechanism operatively connected with said spindle, and means including a manually controlled fluid pressure device constituting a releasable connection between the sleeve member and the support.

11. In a gear cutting machine, a support for the gear blank including a supporting mandrel, a spindle connected with said mandrel, a sleeve surrounding said spindle, indexing mechanism carried by the sleeve and operatively connected with the spindle, and means carried by said sleeve for transmitting an oscillating movement to the said support, said means including a releasable connection including a bolt adapted to clampingly engage with said support to lock the same with the sleeve.

12. In a gear cutting machine, a support for the gear blank including a supporting mandrel, a face plate connected with said mandrel and having an extension attachment, a spindle connected with the mandrel, a sleeve journalled on said spindle, indexing mechanism carried by the spindle, a manually controlled releasable connection between the sleeve member and the extension attachment of the face plate, and an adjustable driving gear train cooperating with said sleeve member and adapted to oscillate the same.

In testimony whereof we hereunto affix our signatures in the presence of two witnesses.

LOUIS A. WOODARD.
HOWARD H. TALBOT.

Witnesses:
HELEN TYLER,
MARY BOLLMAN.